United States Patent
Milner et al.

(10) Patent No.: US 9,446,974 B2
(45) Date of Patent: Sep. 20, 2016

(54) FLUID TREATMENT METHODS AND SYSTEMS

(71) Applicant: EnergySolutions, Inc., Salt Lake City, UT (US)

(72) Inventors: Tim Milner, Lexington, SC (US); Lu Liu, Lexington, SC (US); Paul Sylvester, Waltham, MA (US)

(73) Assignee: EnergySolutions, Inc., Salt Lake City, UT (US)

( * ) Notice: Subject to any disclaimer, the term of this patent is extended or adjusted under 35 U.S.C. 154(b) by 150 days.

(21) Appl. No.: 14/174,499

(22) Filed: Feb. 6, 2014

(65) Prior Publication Data

US 2014/0216946 A1  Aug. 7, 2014

Related U.S. Application Data

(60) Provisional application No. 61/761,607, filed on Feb. 6, 2013.

(51) Int. Cl.
*C02F 9/00* (2006.01)
*C02F 1/04* (2006.01)
(Continued)

(52) U.S. Cl.
CPC . *C02F 9/00* (2013.01); *C02F 1/04* (2013.01); *C02F 1/24* (2013.01); *C02F 1/40* (2013.01); *C02F 1/444* (2013.01); *C02F 1/463* (2013.01); *C02F 1/4672* (2013.01); *C02F 11/006* (2013.01); *C02F 2101/32* (2013.01); *C02F 2209/005* (2013.01); *C02F 2209/06* (2013.01)

(58) Field of Classification Search
CPC ........ C02F 1/463; C02F 1/465; C02F 1/467; C02F 1/4672; C02F 1/4674
See application file for complete search history.

(56) References Cited

U.S. PATENT DOCUMENTS

| 8,158,097 B2 | 4/2012 | DiTommaso et al. |
| 8,273,320 B2 | 9/2012 | DiTommaso et al. |

(Continued)

FOREIGN PATENT DOCUMENTS

| WO | 2011000079 | 1/2011 |
| WO | 2012063214 | 5/2012 |

(Continued)

OTHER PUBLICATIONS

International Search Report for PCT/US14/15116, May 16, 2014, 2 pgs.

(Continued)

*Primary Examiner* — Keith Hendricks
*Assistant Examiner* — Salil Jain
(74) *Attorney, Agent, or Firm* — Holland & Hart LLP

(57) ABSTRACT

Methods and systems for treatment of wastewater. In some embodiments, the system may comprise one or more modules such as an electrochemical module, an electrocoagulation module, a flotation module, an evaporation module, and an ultrafiltration module. One or more detection modules may also be provided to analyze the concentration of one or more wastewater components in the wastewater. Data from such modules may be used to adjust one or more operational parameters or conditions in the treatment system. The system may also comprise one or more features designed to minimize adverse effects on the environment, such as avoiding adding chemicals to the stream, extracting salt or other chemicals for re-use, and/or use of carbon dioxide gas from on-site combustion processes.

11 Claims, 4 Drawing Sheets

(51) Int. Cl.

| | |
|---|---|
| C02F 1/24 | (2006.01) |
| C02F 1/40 | (2006.01) |
| C02F 1/44 | (2006.01) |
| C02F 1/463 | (2006.01) |
| C02F 1/467 | (2006.01) |
| C02F 11/00 | (2006.01) |
| C02F 101/32 | (2006.01) |

(56) References Cited

U.S. PATENT DOCUMENTS

| | | | |
|---|---|---|---|
| 8,318,027 B2 | 11/2012 | McGuire et al. | |
| 8,347,960 B2 | 1/2013 | Mothersbaugh et al. | |
| 2004/0154988 A1* | 8/2004 | Sheets, Sr. | C02F 1/36 210/718 |
| 2006/0237318 A1* | 10/2006 | Polnicki | C02F 1/463 204/518 |
| 2007/0102359 A1 | 5/2007 | Lombardi et al. | |
| 2009/0125241 A1 | 5/2009 | Frank | |
| 2009/0321251 A1 | 12/2009 | Rigby | |
| 2010/0116686 A1* | 5/2010 | Wiemers | B01D 61/022 205/742 |
| 2011/0210075 A1* | 9/2011 | Enos | C02F 1/4602 210/702 |
| 2012/0152830 A1 | 6/2012 | Shafer et al. | |
| 2012/0228219 A1 | 9/2012 | Goebel et al. | |
| 2012/0325469 A1 | 12/2012 | Olson et al. | |
| 2012/0325744 A1 | 12/2012 | Polizzotti et al. | |
| 2013/0048562 A1 | 2/2013 | Keister | |
| 2013/0075332 A1* | 3/2013 | Prakash | C02F 1/463 210/639 |
| 2013/0075334 A1 | 3/2013 | Prakash et al. | |
| 2013/0118988 A1 | 5/2013 | Xu et al. | |
| 2013/0118994 A1 | 5/2013 | Altman | |
| 2013/0161262 A1 | 6/2013 | Henley | |
| 2014/0190898 A1* | 7/2014 | Alcantar | C02F 1/62 210/726 |

FOREIGN PATENT DOCUMENTS

| | | |
|---|---|---|
| WO | 2012078848 | 6/2012 |
| WO | 2012136064 | 10/2012 |
| WO | 2012145118 | 10/2012 |
| WO | WO 2013007847 A1 | 1/2013 |

OTHER PUBLICATIONS

Written Opinion for PCT/US14/15116, May 16, 2014, 8 pgs.
Zabolotsky V. I. et al., "Electrodialysis Technology for Deep Demineralization of Surface and Ground Water," Desalination, Elsevier, Amsterdam, Netherlands, vol. 108, No. 1/03, Feb. 1, 1997, pp. 179-181, XP000782059, ISSN: 0011-9164, DOI: 10.1016/S0011-9164 (97) 00025-8.
Supplementary Partial European Search Report for EP Application No. 14748865, mailed May 29, 2016.

* cited by examiner

FLUID TREATMENT METHODS AND SYSTEMS

RELATED APPLICATIONS

This application claims the benefit under 35 U.S.C. §119(e) of U.S. Provisional Patent Application No. 61/761,607 filed Feb. 6, 2013 and titled "FLUID TREATMENT METHODS AND SYSTEMS," which application is incorporated herein by reference in its entirety.

SUMMARY

Disclosed herein are embodiments and implementations of methods and systems for treatment of fluids, such as wastewater from a fracking site. In some embodiments, the system may comprise one or more modules such as an electro-oxidation module, an electrocoagulation module, a flotation module, an evaporation module, and an ultrafiltration module. One or more detection modules may also be provided to analyze the concentration of one or more wastewater components in the wastewater. Data from such modules may be used to adjust one or more operational parameters or conditions in the treatment system. The system may also comprise one or more features designed to minimize adverse effects on the environment, such as avoiding adding chemicals to the stream, extracting salt or other chemicals for re-use, and/or use of carbon dioxide gas from on-site combustion processes.

In one particular example of a system for treatment of wastewater, a wastewater feed port configured to receive an incoming stream of wastewater may be provided. The system may further comprise an electro-oxidation module configured to receive an incoming wastewater stream and increase the pH of the wastewater stream passing therethrough. In some embodiments, one or more of the modules may be configured to increase the pH of the wastewater stream to between about 11 and about 12. In some embodiments, the pH of the stream may be increased without adding chemicals to the water.

An electrocoagulation module may also be provided comprising at least two electrodes. The electrocoagulation module may be configured to receive an incoming wastewater stream and remove one or more contaminants from the wastewater stream passing therethrough. In some embodiments, the electro-oxidation module and the electrocoagulation module may be part of a single combined electrochemical treatment unit.

The system may further comprise a flotation module configured to receive and separate an incoming wastewater stream into an aqueous phase stream and one or more other streams, such as an oil phase stream, a sludge phase stream, and/or a stream comprising oil and solid particles. An evaporation module may be configured to receive the aqueous phase stream from the flotation module and further configured to precipitate scale-forming elements within the aqueous phase stream. In some embodiments, the flotation module may further be configured to skim coagulated oil from the surface of the wastewater stream entering the flotation module.

In some embodiments, the system may further comprise a carbon dioxide line configured to deliver carbon dioxide gas to the evaporation module. In some such embodiments, the carbon dioxide gas delivered to the carbon dioxide gas line may be generated from exhaust resulting from the combustion of hydrocarbon fuels at a treatment site of the system for treatment of wastewater. For example, the carbon dioxide gas delivered to the carbon dioxide gas line may be generated from exhaust resulting from the combustion of hydrocarbon fuels by one or more modules of the treatment system.

An ultrafiltration module may be configured to receive an incoming stream and deliver an outgoing stream of permeate comprising a salt solution, such as a solution comprising sodium chloride salt and/or one or more other salts. Such solution may, in some embodiments, be further processed, such as by way of a thermal processing module, to obtain a reusable salt product. Such a thermal processor may be configured to receive an incoming stream comprising a concentrated NaCl solution from an ultrafiltration module and deliver a solid NaCl at first port and a purified stream of water at a second port.

In some embodiments, a Reverse Osmosis (RO) module may also be included. This may be useful to separate an incoming stream into outgoing streams comprising one or more high-TDS streams and one or more low-TDS streams. The high-TDS stream may be sent to an evaporator, such as a thermal processor, to produce one or more solid products, such as a solid sodium chloride salt product, if desired.

One or more detection modules, such as Laser Induced Breakdown Spectroscopy modules, may also be provided that may be configured to analyze the concentration of one or more chemical components in the wastewater. Such detection module(s) may further be configured to transmit data to one or more other modules in the system to adjust one or more operational parameters or conditions in the system, such as disabling one or more modules in the wastewater treatment system, adjusting an operational parameter of one or more modules in the wastewater treatment system, diverting a stream of wastewater to bypass one or more modules in the wastewater treatment system, or recirculating the wastewater through one or more modules in the wastewater treatment system.

In some embodiments, one or more detection modules may be positioned and configured to detect a pH of wastewater before the wastewater enters the electro-oxidation module. In some such embodiments, the system may be configured to disable the electro-oxidation module and/or divert the wastewater stream to avoid the electro-oxidation module and/or the electrocoagulation module upon detecting a threshold pH of wastewater before the wastewater enters the electro-oxidation module. In some embodiments, this threshold may be about 11, and the electro-oxidation module and/or electrocoagulation module may be configured to increase the pH of the wastewater stream to between about 11 and about 12 upon receiving an indication from the detection module that the wastewater stream has a pH below the threshold.

In some embodiments, the system may comprise a mobile wastewater treatment system configured to allow for transporting the wastewater treatment system to a plurality of distinct treatment sites. For example, the mobile wastewater treatment system may comprise at least one of a trailer and a motor vehicle.

In a particular example of a method for treatment of wastewater, the method may comprise receiving an incoming stream of wastewater in a wastewater feed port, gathering real-time data from the wastewater comprising at least one of data concerning the constituents in the wastewater and a concentration of one or more constituents in the wastewater, and using the real-time data to determine whether to modify one or more modules or parameters in a wastewater treatment system. Upon determining from the real-time data that one or more modules or parameters in the wastewater treatment system should be modified, the method may further comprise modifying one or more modules or parameters in the wastewater treatment system. The step of gathering real-time data from the wastewater may be performed using, for example, Laser Induced Breakdown Spectroscopy technology.

The method may further comprise increasing a pH of the wastewater. In some implementations, the step of increasing a pH of the wastewater may be performed using an electrochemical treatment method, and the step of increasing a pH of the wastewater may be performed without adding any chemicals to the wastewater.

In some implementations, the step of receiving an incoming stream of wastewater in a wastewater feed port may be performed after the step of gathering real-time data from the wastewater.

In some implementations, the step of modifying one or more modules or parameters in the wastewater treatment system may comprise at least one of disabling one or more modules in the wastewater treatment system, adjusting an operational parameter of one or more modules in the wastewater treatment system, diverting a stream of wastewater to bypass one or more modules in the wastewater treatment system, and recirculating the wastewater through one or more modules in the wastewater treatment system.

In some implementations, the step of gathering real-time data from the wastewater may comprise assessing a pH level of the wastewater to determine whether the pH level meets a threshold, such as 11. In some such implementations, the step of increasing a pH of the wastewater may comprise increasing the pH of the wastewater to between about 11 and about 12.

In a specific example of a method for treatment of wastewater at a fracking site, the method may comprise receiving an incoming stream of wastewater from a fracking operation, confirming the presence of oil within the wastewater, and, upon confirming the presence of oil within the wastewater, determining whether one or more alkaline earth metals, such as Ca, Mg, Sr, and Ba, is present in the wastewater beyond a particular threshold concentration.

Upon confirming that the threshold has been exceeded, the pH level of the water may be increased. In some embodiments, the pH level may be increased to between about 11 and about 12 using an electrochemical treatment method.

Upon confirming that the threshold has not been exceeded, the step of adjusting a pH level of the water may be bypassed. Following the step of either adjusting a pH level of the water or bypassing the step of adjusting a pH level of the water, the water may be sent through at least one treatment process comprising at least one of electrocoagulation, electro-oxidation, dissolved air flotation treatment, precipitation of scale-forming elements using carbon dioxide gas, and ultrafiltration.

In some implementations, the method may comprise determining whether Ca is present in the wastewater and determining whether the Ca in the wastewater exceeds a first threshold. The method may further comprise determining whether Mg is present in the wastewater and determining whether the Mg in the wastewater exceeds a second threshold. In some implementations, the first threshold may comprise about 1000 mg/L, and the second threshold may comprise about 500 mg/L.

Upon confirming that at least one (or, in some implementations, both) of the first and second thresholds has been exceeded, the method may further comprise adjusting a pH level of the water to between about 11 and about 12. This may be performed, in some implementations, using an electrochemical treatment method.

Upon confirming that at least one of the first threshold and the second threshold has not been exceeded, the step of adjusting a pH level of the water may be bypassed. In some embodiments, the step of adjusting a pH level of the water may not be bypassed unless both the first threshold and the second threshold have not been exceeded.

Following the step of either adjusting a pH level of the water or bypassing the step of adjusting a pH level of the water, the water may be sent through one or more of the treatment processes disclosed herein, such as, for example, electrocoagulation, dissolved air flotation treatment, precipitation of scale-forming elements using carbon dioxide gas, and ultrafiltration.

In some embodiments, if a concentration of carbon greater than a particular threshold or a concentration of total alkaline earth metals (Ca, Mg, Sr, and Ba, for example), or one or more such alkaline earth metals, is less than another particular threshold, electro-oxidation may be bypassed by either disabling an electro-oxidation module or diverting the stream around this module. For example, in some embodiments, upon detecting a concentration of carbon at a threshold of about 600 mg/L and/or detecting a concentration of alkaline earth metals below about 50 mmol/L, electro-oxidation may be bypassed.

In some embodiments, a threshold concentration or concentrations may be associated with particular alkaline earth metals. For example, in some embodiments, detecting a concentration of calcium less than a particular threshold, such as about 800 mg/L in one preferred embodiment, and about 1000 mg/L in another preferred embodiment, may be used, in some embodiments in combination with assessing the concentration of carbon, to determine whether to bypass electro-oxidation. However, if the carbon detected in the wastewater stream is below a threshold and the alkaline earth metal concentration (or one or more such alkaline earth metals) is above another threshold, electro-oxidation may be performed and electrocoagulation may instead be bypassed by either disabling an electrocoagulation module or diverting the stream around this module.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
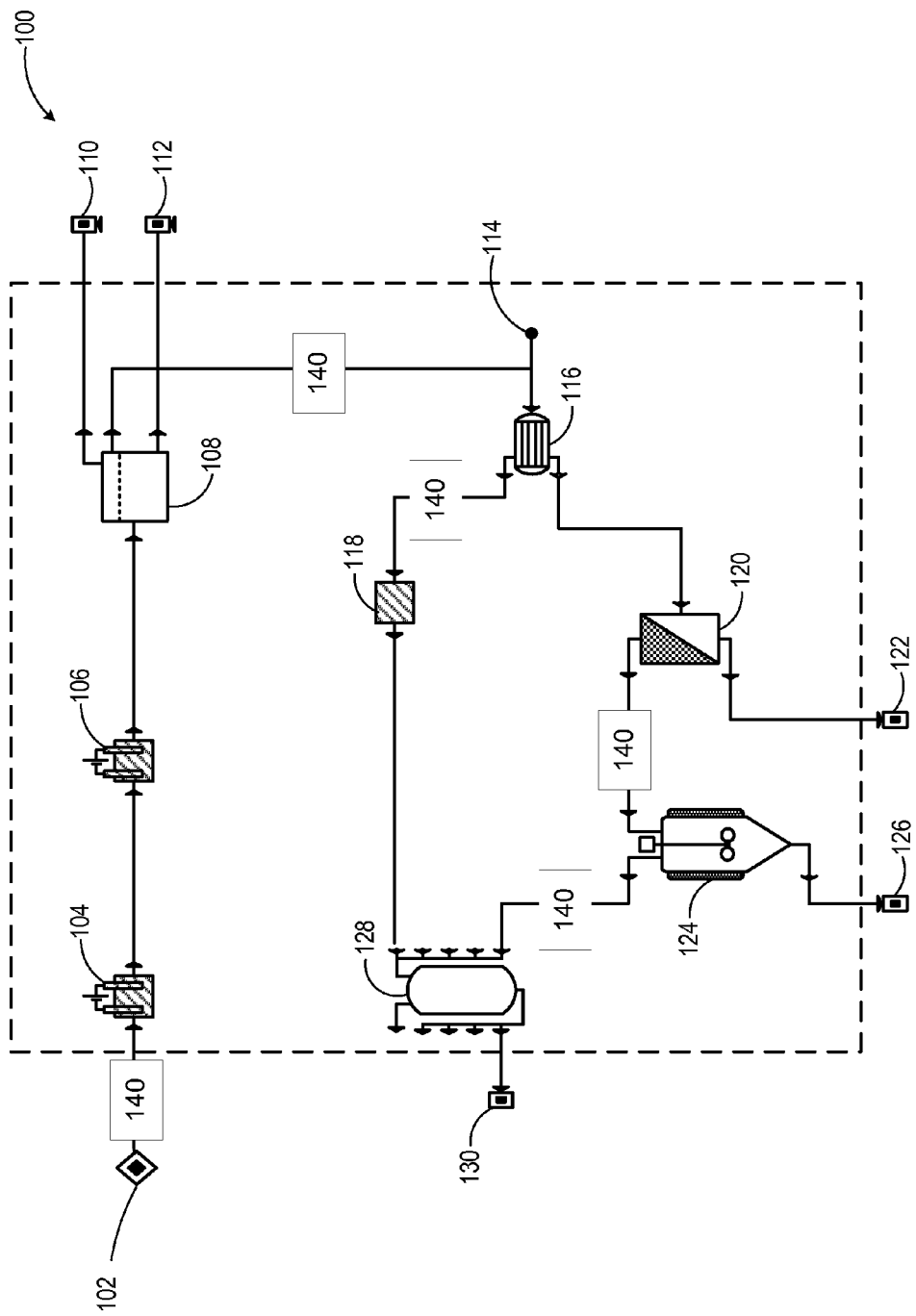
FIG. 1 is a schematic diagram of one embodiment of a system for treatment of a fluid, such as wastewater.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail in order to avoid obscuring aspects of the disclosure. Furthermore, the described features, structures, steps, or characteristics may be combined in any suitable manner in one or more alternative embodiments and/or implementations.

The present disclosure provides various embodiments and implementations of methods and systems for treatment of a fluid, such as, for example, wastewater in the oil and gas industries. More specific examples of contexts in which the inventive methods and systems described herein may be employed include, for example, frac flowback water treatment, produced water treatment, and steam-assisted gravity drainage (SAGD) water treatment.

In some embodiments and implementations, one or more steps and/or units may be provided by way of one or more mobile treatment units. In some embodiments, the entire system may comprise a mobile treatment system. For example, a mobile water treatment system may be configured to both transport and treat a fluid, such as wastewater. Alternatively, such systems may be configured to provide mobile treatment but not transportation. In other words, the system may be configured to treat and dispense water at a usage site.

Some mobile systems may comprise, for example, a trailer and/or a motor vehicle. Some such systems may comprise one or more fluid storage containers, one or more fluid treatment units, and/or one or more fluid delivery pumps. In some embodiments, the fluid treatment systems may be incorporated into the fluid storage containers, such that wastewater, for example, may be treated while it is contained in a fluid storage container.

Some embodiments may also be modular, such that one or more modular units may be replaced individually within the system. Some embodiments may be both mobile and modular, such that the entire system, or at least a portion of the system, is provided on a mobile device, such as a trailer or vehicle, and such that one or more units in the system may be modular to allow for selective replacement of individual treatment units within the system.

Some embodiments may be configured to function by way of sustainable, relatively low energy input. Some embodiments may further be configured so as to be environmentally benign. For example, some embodiments may provide for wastewater treatment while also providing a low carbon footprint compared to alternative systems.

Some embodiments may further provide for the reclamation of resources from waste streams, such as those resulting from oil and gas production, in order to render the waste streams suitable for reuse, recovery, or disposal as environmentally-benign waste forms.

Some embodiments may comprise the use of carbon dioxide gas as a source of carbonate in the selective removal and recovery of certain substances, such as radium and other alkaline earth metals. In some embodiments, carbon dioxide may be provided as waste gas from another process (e.g., the combustion of hydrocarbon fuels) and fed into such a system or module rather than being discarded. This may contribute to the environmentally-friendly aspects of various embodiments of the invention by reducing carbon emissions, for example.

As discussed in greater detail below, some embodiments may employ one or more electrochemical processes. By doing so, treatment processes may, in some embodiments and implementations, be provided that are free from chemical agent additives. This may thereby further reduce the negative impact to the environment, such as by, in some embodiments, further reducing the carbon footprint associated with the production and/or transport of chemical agents to a processing site.

Some embodiments may be configured to recycle wastewater to allow for reuse in, for example, the oil and gas industry. In other words, some embodiments may allow for use of treated wastewater in one or more post-treatment steps, processes, or systems. The wastewater from such steps, processes, or systems may then, in some embodiments, be input back into a treatment process/system such that water may be continually reused, treated, and then used again without wasting water along the way. In some embodiments, the recycling may be tailored to meet a specified reuse criteria. For example, some embodiments may be configured to produce treated water that meets federal regulations for drinking water, or that meets the criteria of a particular permit.

Some embodiments may be configured to produce sodium chloride as a treatment byproduct. In some such embodiments, an aqueous stream of sodium chloride may be provided as a treatment byproduct. Some such embodiments may be configured such that the sodium chloride stream comprises a concentrated, purified sodium chloride aqueous stream. In such embodiments, subsequent thermal processing may also be provided so as to produce a useful resource, such as road salt. The finished salt product in such systems may be usable in other processing steps/systems or, alternatively, may be stored for sale or use in other systems/processes.

Some embodiments and implementations may be configured to reduce and/or minimize the amounts of heavy metal hydroxide byproducts. Instead, such systems and methods may be configured to provide useful byproducts that can either be reused, stored for later sale, or will otherwise be less damaging to the environment. For example, some embodiments may be configured to provide a concentrated source of alkaline earth carbonates as a byproduct.

Some embodiments may be configured for the partitioning of waste into a plurality of separate waste streams. Such partitioning may provide for beneficial reuse or production of environmentally benign waste that requires no additional chemical agents.

Some embodiments and implementations may comprise use of a porous membrane in, for example, a crossflow filtration process/system. Some such embodiments may comprise crossflow ultrafiltration processes/systems. In some embodiments, the porous membrane provided may comprise a ceramic material. Alternatively, the porous membrane may comprise a sintered metal or polymeric construction. Irrespective of the materials used, some embodiments may be configured to effectively separate solid products for recycle from aqueous streams by way of the aforementioned crossflow filtration. Other embodiments and implementations may comprise use of one or more other types of filtration, such as sand filtration.

Some embodiments and implementations may further comprise use of in-situ electrochemically-generated oxidants such as, for example, sodium hypochlorite. Such electrochemically-generated oxidants may, in some embodiments, be obtained from a waste steam, such as a waste brine feed stream, and/or a waste hydroxide stream.

Some embodiments may further comprise removal of silica. Such removal may be accomplished via electrocoagulation in some embodiments. In such embodiments, downstream barrier filtration devices may be protected from silica fouling.

Some embodiments may comprise electrochemical mineralization of water soluble organic pollutants. Some embodiments may also, or alternatively, comprise separation of heavy oil via entrained gas floatation, thereby removing these particles from cross contamination of subsequent process production of viable resources for reuse.

Some embodiments may further comprise a methodology for raising the pH of the waste solution. In some such embodiments, electrochemical treatment methods may be used in order to avoid the need for transporting chemicals to the treatment site.

Some embodiments and implementations may further comprise the use of one or more low energy evaporative techniques. In some such techniques, one or more hydrocavitation processes may be employed. Since such processes are typically performed without need for chemical additives, they may further enhance the ability of the system to avoid harming the environment, and enhance the ability of the system to allow for recycling/reuse of wastewater following treatment. Such systems may also be used to kill bacteria and reduce corrosion of certain components of the system in certain embodiments.

In some embodiments and implementations, carbon dioxide may be utilized to form carbonates of alkaline earth metals in one or more of the hydrocavitation steps. This may render the resultant alkaline metal carbonates as finely dispersed precipitates, which may enhance the ease of subsequent mechanical filtration and may further prevent or at least reduce scaling of one or more components of an evaporative system through, for example, in-situ sequestration of alkaline earth scalants.

Some embodiments may not only be configured to recycle water or other treated fluids, but may also, or alternatively, be configured to recycle heat energy. For example, some embodiments may be configured to use waste heat from one or more processes/systems to fuel an evaporative drying of purified sodium chloride for production of useful products such as, for example, road salt. Alternatively, or additionally, waste heat from one or more processes/systems may be used to recover one or more other potentially-valuable resources as a treatment byproduct such as, for example, lithium salts. Such resources may be stored for later reuse, used on-site, or a combination of the two. Examples of methods and systems that may be used to recover lithium salts are provided in U.S. Pat. No. 6,936,229 titled "Recovery of Lithium Compounds from Brines," which is hereby incorporated by reference in its entirety.

Some embodiments and implementations may further comprise use of analytical systems and/or techniques to gather and/or process data in an effort to optimize one or more process conditions. In some such embodiments, the systems and/or techniques may gather such data in real time. By so optimizing process conditions some embodiments may allow for waste streams to be efficiently partitioned for beneficial reuse. For example, in some embodiments and implementations, the current density and/or the retention time for one or more electrochemical processes may be adjusted as needed in response to real-time parameters and/or conditions. As another example, the amount of carbon dioxide used during cavitation may be adjusted based upon one or more real-time parameters and/or conditions. Similarly, in some embodiments and implementations, the settling time for flotation/sedimentation may be adjusted based upon one or more real-time parameters and/or conditions. In other embodiments and implementations, one or more of these parameters may instead be adjusted manually. Of course, some embodiments may be configured to be selectively adjusted to allow for automatic adjustment based upon real-time condition(s), or to allow for manual adjustment when desired.

Such systems and/or techniques may, in some embodiments, comprise use of a Laser Induced Breakdown Spectroscopy instrument or system or another similar real-time detection module. Some such embodiments may comprise use of a field portable Laser Induced Breakdown Spectroscopy instrument or system. Alternatively, or additionally, X-Ray Fluorescence (XRF) techniques may be applied to assess real-time conditions.

Further details of certain examples of embodiments of methods and systems according to the present disclosure will now be provided in conjunction with the accompanying drawings. FIG. 1 depicts an example of a system 100 for treating a fluid, such as wastewater. In some embodiments, system 100 may comprise a mobile treatment system. As such, system 100, or at least one or more of its constituent components, may be mounted or otherwise positioned on, for example, a vehicle, trailer, or the like. System 100 may, in such embodiments, thereby be brought to a particular site, such as a fracking site, a drilling site, a refinery, or another site in which wastewater is created and/or water is needed in, for example, the oil and gas industries.

The wastewater from such a site may be routed through treatment system 100 at, for example, waste feed port 102. As those of ordinary skill in the art will appreciate, the wastewater entering waste feed port 102 may include, for example, oil, soluble organic compounds, suspended solids, silica, sodium ions, potassium ions, lithium ions, chloride ions, iron ions, manganese ions, magnesium ions, strontium ions, calcium ions, barium ions, radium ions, and/or other transition metal ions and/or anionic and/or cationic species.

In some embodiments, upon entering waste feed port 102, the wastewater may be first routed through an electro-oxidation module 104. In some embodiments, electro-oxidation module 104 may be configured to generate certain substances in-situ, such as sodium hypochlorite. In some embodiments, certain substances, such as NaCl from the waste stream, may be used in generating sodium hypochlorite.

In some embodiments, as depicted in FIG. 1, prior to entering electro-oxidation module 104, a Laser-Induced Breakdown Spectroscopy (LIBS) module 140 may be used to analyze the concentration of one or more wastewater components in the feed, such as alkaline metals, alkaline earth metals, total carbon, and/or iron, for example. Data gathered from LIBS module 140 may be used to alter and/or disable one or more other modules in the treatment system 100.

For example, in some embodiments, if the LIBS module 140 detects a concentration of carbon greater than a particular threshold or a concentration of total alkaline earth metals (Ca, Mg, Sr, and Ba, for example), or one or more such alkaline earth metals, is less than another particular threshold, the electro-oxidation module 104 may be bypassed by either disabling electro-oxidation module 104 or diverting the stream around this module. For example, in some embodiments, upon detecting a concentration of carbon at a threshold of about 600 mg/L and/or detecting a concentration of alkaline earth metals below about 50 mmol/L, the electro-oxidation module 104 may be bypassed by either disabling electro-oxidation module 104 or diverting the stream around this module.

In some embodiments, a threshold concentration or concentrations may be associated with particular alkaline earth metals. For example, in some embodiments, detecting a concentration of calcium less than a particular threshold, such as about 1000 mg/L for example, may be used to determine whether to bypass electro-oxidation. However, the electrocoagulation module 106 may remain active and the wastewater stream may be fed therethrough. However, if the carbon detected by the LIBS module 140 is below a threshold and the alkaline earth metal concentration (or one or more such alkaline earth metals) is above a threshold, electro-oxidation may be performed in electro-oxidation module 104 and electrocoagulation may be bypassed by either disabling electrocoagulation module 106 or diverting the stream around this module. The operating parameter (e.g., the upper boundary of treatment time) may be determined by using detected values of the concentrations of major cation contaminants, such as Ca, Mg, and/or Na obtained via LIBS in order to prevent undesired pH swings.

LIBS module 140 may comprise a unit that is physically installed online as part of system 100. Alternatively, LIBS module 140 may comprise a handheld or otherwise portable device used by an operator of system 100. In some embodiments, LIBS module 140 may be incorporated into system 100 such that data generated from LIBS module 140 may be automatically transmitted to other units in system 100 and/or otherwise used by system 100 to alter one or more functions, modules, and/or aspects of system 100. In alternative embodiments, data generated from LIBS module 140 may be manually input by a user into a computer system, which computer system may be an integral part of treatment system 100, and may then be used by system 100 to alter one or more functions, modules, and/or aspects of system 100. As still another alternative, in some embodiments, data generated from LIBS module 140 may be used to manually alter one or more functions, modules, and/or aspects of system 100. For example, a user may take a reading from LIBS module 140 and assess the need for one or more modules in system 100 and/or one or more parameters of one or more such modules and manually disable, take off line, or otherwise adjust such module(s) as needed in accordance with such data.

In some embodiments, one or more of the modules, such as electro-oxidation module 104 and/or electrocoagulation module 106, may be configured to increase the pH of the wastewater stream to between about 11 and about 12. The wastewater stream may also be sterilized by the electro-oxidation module 104. In addition, total organic carbon may be reduced and/or Fe, Mn, Mg, and/or other heavy metal ions may be precipitated at this stage in the system.

The stream may then be sent to an electrocoagulation module 106. Electrocoagulation module 106 may be configured to precipitate silica and/or separate entrained organic material(s). In some embodiments, electrocoagulation module 106 may be combined with electro-oxidation module 104 in a single combined electrochemical module. In other words, the functions associated with the electro-oxidation module 104 and the electrocoagulation module 106 may be combined in a single unit if desired.

Once the stream exits electrocoagulation module 106 (or a combined electrochemical module), the stream may then be sent to a flotation/sedimentation module 108. Flotation/sedimentation module 108 may be configured to skim coagulated oil from the surface of the fluid. In some embodiments, the sludge (containing, for example, TSS, silica, microorganism cells, Fe, Mn, and/or transition metal precipitates) may also be separated from the aqueous phase within flotation/sedimentation module 108.

In some embodiments, electrocoagulation module 106 may be combined with flotation/sedimentation module 108. For example, a DAF ("Dissolved Air Flotation") unit may be combined with an EC module by bubbling air or another gas through a perforated pipe, disk, and/or plate, which may be located on the bottom of an EC chamber in the EC/DAF module. The electrodes in the EC/DAF module can be made up of, for example, iron, steel, aluminum, and/or stainless steel materials.

The geometry/arrangement of the electrodes in the EC/DAF module may be of plate design, annulus design, or a combination of the two. In embodiments in which plates are used, such plates may be solid, perforated, or mesh. However, it has been discovered that using aluminum as the EC electrode may obviate the DAF unit, in which case rather than combining modules 106 and 108, such an embodiment may simply remove or bypass module 108. Without being limited by theory, it is thought that this may be true because the gas bubbles formed on the surface of the aluminum electrode(s) may provide the same, or at least a similar, function as would have been provided by a DAF unit.

Electrocoagulation may be effective in the removal of silica and transition metals, such as Fe and Mn. However, higher current and/or longer treatment times may be needed in order to remove alkaline earth metals. As discussed in greater detail below in the Examples, by providing relatively high surface area per plate, a greater number of parallel plates, and/or decreasing the distance between the plates, the applied voltage necessary to achieve desirable treatment results may be reduced, thereby decreasing energy usage/requirements. In some embodiments, the polarity of electrical current to the various plates may be alternating to prevent scale build-up on the surface of the electrodes and also to equalize electrode consumption.

Some embodiments may be configured to separate the incoming stream to flotation/sedimentation module 108 into a plurality of outgoing streams. For example, in the embodiment depicted in FIG. 1, the stream entering flotation/sedimentation module 108 is separated into three separate outgoing streams. Namely, in the depicted embodiment, an aqueous phase may be passed along to one or more additional modules within treatment system 100. An oil phase may be separated from flotation/sedimentation module 108, as shown at 110. And a sludge phase may be separated from flotation/sedimentation module 108, as shown at 112. Sludge phase 112 may contain, for example, TSS, microorganism cells, silica, Fe, Mn, and/or other transition metal precipitates. In some embodiments, sludge 112 may be passed along for further treatment. Alternatively, sludge 112 may be directed to a tank or other storage unit. In other embodiments, the stream entering flotation/sedimentation module 108 may instead be separated into just two separate outgoing streams, such as an aqueous stream and a stream comprising oil, grease, and/or solids.

In the depicted embodiment, the aqueous phase is directed into an evaporation and/or cavitation module 116. In some embodiments, evaporation/cavitation module 116 may comprise an energy-efficient, low-energy evaporation module.

In some embodiments, as depicted in FIG. 1, carbon dioxide gas 114 may be introduced to evaporation module 116 in order to facilitate precipitation of scale-forming elements (Ca, Mg, Ba, and Sr, for example) within the aqueous phase. In some embodiments, carbon dioxide may be added to the system by way of a tank or the like. Alternatively, the carbon dioxide may be diverted from exhaust gases produced from, for example, the combustion of hydrocarbon fuels (e.g., diesel, natural gas, etc.), which may further improve the impact to the environment by system 100 in such embodiments. In some embodiments, carbon dioxide from such combustion that is already taking place at one or more modules within the system, or is otherwise already taking place at the treatment site, may be utilized during this process. In this manner, system 100 may not only avoid detrimental impact on the environment, but may improve the environment by, for example, reducing the carbon footprint of the system. Some embodiments may be configured to use carbon dioxide from combustion when it is available, and to use carbon dioxide from a tank when combustion carbon dioxide is not currently available.

In some embodiments, cavitation may also be used to ensure the precipitates maintain a suitable morphology for filtration and do not precipitate out as scale on the equipment. In some embodiments, such cavitation may be provided for within evaporation/cavitation module 116. Some embodiments may comprise use of ultrasound to generate cavitation within module 116 to physically degrade large particulates in the stream. Some embodiments may additionally, or alternatively, comprise use of heat and/or highly-oxidizing conditions. Evaporation/cavitation module 116 can be used in a single pass mode or, in some embodiments, a recirculation mode. In other embodiments, evaporation and cavitation may be provided in separate modules.

In some embodiments, a LIBS module 140 may be included in the line prior to module 116 to guide the operation of cavitation module 116. For example, in some embodiments, the amount of Ca (data obtained via one or more LIBS modules) may influence the retention time for $CO_2$ cavitation treatment as well as the pressure used during cavitation. Furthermore, in some embodiments, pH adjustment may be guided based on the information of the concentration of Ca and/or Mg.

In some embodiments, chemistry data collected by one or more LIBS modules 140 may be fed back to fine tune module 116. For example, if Na content is larger than about 20 mg/L, the steam-to-liquid ratio may be changed (by decreasing operating temperature and/or increasing pressure). Furthermore, the LIBS analysis on the ultrafiltration permeate may be fed back to fine tune the $CO_2$ cavitation. For example, if the permeate contains Ca over 15 mg/L, the retention time of $CO_2$ treatment may need to be increased.

In some embodiments, as depicted in the embodiment of FIG. 1, another LIBS module 140 may be included after module 116 to ensure that treatment goals are being met. If such treatment goals are not being met, system 100 may be configured to recirculate the stream back through module 116 and/or one or more other modules. For example, in some embodiments, system 100 may be configured to set one or more treatment thresholds, such as a threshold of cations (primarily Na, K, Ca, and Mg) of about 600 mg/L. If a LIBS reading shows that the total concentration of cations is larger than about 600 mg/L, system 100 may be configured to recirculate the stream through the evaporation/cavitation module 116.

Steam generated from evaporation/cavitation module 116 may, in some embodiments, be condensed, which may result in low-TDS (Total Dissolved Solids) water that may be suitable for multiple applications. In the depicted embodiment, steam from evaporation/cavitation module 116 may be delivered to condenser 118. Water generated from condenser 118 may be delivered to a tank 128. Tank 128 may comprise a storage tank that may be used to store the water for later use. Alternatively, tank 128 may comprise a recycling tank that may be fed into one or more other processes/systems on site. In some embodiments, tank 128 may serve both purposes. In other words, tank 128 may be used to recycle water and may also be used to store any excess water generated from system 100. Water from tank 128 may be delivered out of system 100 at 130 if desired. As shown in FIG. 1, tank 128 may have a plurality of outlets for delivery of water for other systems/processes/purposes, including for use in processes involved in system 100 and other processes/systems on site.

In some embodiments, as mentioned above, system 100 may be configured to produce water that may be reused on site. Some embodiments may be configured to treat wastewater sufficiently such that it is potable once it reaches tank 128. In other embodiments, such water may not be potable but may be sufficiently clean/treated to be used in other systems/processes at a treatment site.

The resultant solution generated from evaporation/cavitation module 116 may have a high-salt concentration. This resultant solution may also contain precipitated carbonates and/or other solids. This solution may then be passed through a crossflow filtration module 120 (ultrafiltration, for example). Crossflow filtration module 120 may comprise a crossflow ultrafiltration module 120 in some embodiments. Crossflow filtration module 120 may, in some embodiments, comprise membranes made up of a ceramic, sintered metal, and/or polymeric material. As mentioned above, in other embodiments, other filtration modules and/or methods may be used, such as sand or other media filtration.

Solid materials concentrated from crossflow filtration module 120 may be delivered out of treatment system 100 at 122. Such materials can be disposed of as waste, utilized in one or more other processes within system 100 or otherwise at the site of system 100, or can be stored in a tank or another such storage unit at 122 for later use or disposal. Since the solid materials from crossflow filtration module 120 may comprise a concentrated source of Ca, Ba, and/or Sr chemicals, it may be desirable in some embodiments to store and/or reuse such chemicals.

The permeate from crossflow filtration module 120, which may comprise a concentrated NaCl solution, may be thermally processed using a thermal processor 124. Some embodiments may be configured to deliver water into storage tank 128 from both thermal processor 124 and condenser 118, as shown in FIG. 1. Thermal processor 124 may, in some embodiments, operate using waste heat generated from elsewhere in system 100 to further reduce energy usage/demands. In some embodiments, a solid product may be delivered from thermal processor 124 at 126. In some embodiments, the solid product delivered from thermal processor 124 may comprise NaCl. This reclaimed NaCl may, in some embodiments, be stored for later use in a wide variety of applications, such as winter road deicing, for example. Depending on the source of wastewater, one or more other high value resource elements, such as Li, may be reclaimed from the wastewater, which may be subject to further processing in some embodiments if economically viable. As shown in FIG. 1, additional water may be reclaimed from thermal processor and directed to tank 128.

In some embodiments, module 120 may alternatively comprise, or additionally comprise, a Reverse Osmosis (RO) module. This may be useful to separate an incoming stream into outgoing streams comprising one or more high-TDS streams and one or more low-TDS streams. The high-TDS stream may be sent to an evaporator, such as thermal processor 124, to produce one or more solid products, such as a solid sodium chloride salt product, if desired.

In some embodiments, the Reverse Osmosis (RO) unit may be configured to generate a low-TDS stream having less than about 100 mg/l TDS that may be suitable for multiple applications or reuse. The high-TDS stream may be utilized in road deicing operations or directed to an evaporation unit to develop a solid salt product. The RO unit may be equipped with traditional polymeric or polymeric composite membranes comprising one or more polymers and/or additives such as graphene, graphene oxide, and/or carbon nanotubes, for example, that may be configured to enhance the membrane efficiency and/or lower treatment cost. Although wastes with a TDS>about 50,000 mg/l may be unsuitable for treatment via RO through currently known techniques, it is expected that this number may increase as newer, higher efficiency membranes are developed.

LIBS modules 140 may also, if desired, be included before and/or after module 124, as previously discussed. For example, a LIBS module 140 before module 124 may be used to provide a chemistry profile of the NaCl solution from module 120 and such data may be used to guide the operation of thermal processor 124. For example, in some embodiments, the salt concentration obtained by one or more LIBS modules before the stream enters module 124 may be used to determine the steady state set point (temperature, throughput, etc.) for the thermal process. The setting may get the distillate to a quality close to a particular desired requirement or threshold. Therefore, a LIBS module 140 downstream of module 124 may serve as a quality control check point.

Similarly, a LIBS module positioned in between modules 124 and 128 may be used to ensure that treatment goals are being met. For example, in some embodiments, if a threshold of 20 mg/L of total cations (primarily Na) is exceeded, either the steady-state set point of module 124 may be adjusted or the stream may be recirculated back through module 124.

Figure 2:
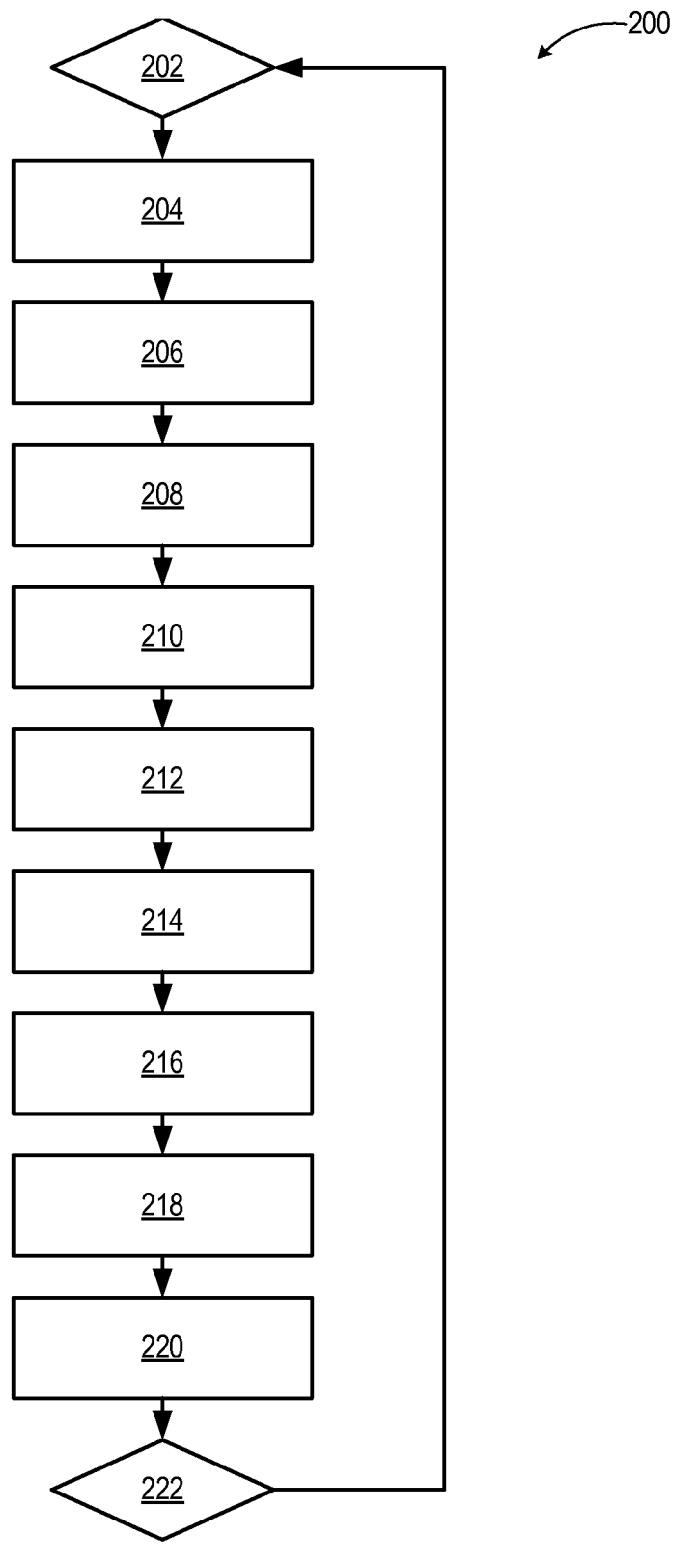
FIG. 2 is a flow chart of one implementation of a method for treatment of a fluid, such as wastewater.

FIG. 2 illustrates an example of a fluid treatment method according to one implementation. As shown in this figure, method 200 may comprise receiving a fluid (wastewater, for example) stream at step 202.

At step 204, a pH level of the fluid stream may be increased. In some implementations, Fe, Mn, and/or other metals may be precipitated or otherwise removed prior to step 204. In other implementations, the pH increase obtained during step 204 may be used to cause most of the Fe and/or other such metals to drop out of the solution due to reaction with atmospheric and/or dissolved oxygen. Step 204 may comprise, in some implementations, raising the pH level of the fluid stream to between about 11 and about 12. As also described above, this may be accomplished, in some implementations, by using an electro-oxidation module. Such a module may, in some implementations, also generate sodium hypochlorite in-situ. In some implementations, the pH increase may be obtained during step 204 by adding NaOH to the fluid stream. In certain embodiments and/or implementations, a separate module may be provided in order to increase or otherwise adjust the pH level of the fluid stream.

At step 206, the fluid stream may be sterilized. Step 206 may be performed, for example, by one or more physical, chemical, and/or electrochemical treatment methods. For example, in some implementations, the fluid stream may be heated to a sufficient temperature to destroy any, or at least most, harmful pathogens. In other implementations, irradiation may be used to sterilize the fluid stream, such as using gamma rays and/or ultraviolet radiation, for example. Chemical methods may comprise, for example, use of acids, alcohols, oxidizing chemicals, bactericides, or other agents such as detergents and the like. In other implementations, sterilization may be combined with one or more other steps. For example, some implementations may comprise sufficient sterilization during oxidation, which may occur during step 204 in some implementations.

At step 208, the fluid stream may undergo an electrocoagulation process. This may, in some implementations, result in the precipitation of silica and/or separation of entrained organic materials.

At step 210, coagulated oil resulting from step 208 may be skimmed from the surface of the fluid stream. Step 212 may comprise separating a sludge from the aqueous phase of the fluid stream. In some implementations, steps 212 and 210 may take place simultaneously, and may take place using a flotation/sedimentation module.

Step 214 may comprise precipitating scale-forming elements, such as calcium, barium, and strontium, for example. In some implementations, radioactive radium may be precipitated during this step to produce a concentrated solid. Such solids may be stored for disposal at an appropriately licensed nuclear waste disposal site. In some implementations, step 214 may be performed using carbon dioxide gas. Such gas may, in some implementations, be introduced from exhaust gases produced from, for example, the combustion of hydrocarbon fuels (e.g., diesel, natural gas, etc.). In some implementations, carbon dioxide from such combustion that is already taking place at one or more modules within a system configured to perform method 200 may be used. In other implementations, carbon dioxide may be introduced from a tank or the like. In some implementations, step 214 may comprise drawing carbon dioxide from an on-site combustion process, or otherwise from another on-site process/system and, if such carbon dioxide is unavailable, drawing carbon dioxide from a backup tank or other storage unit.

Step 216 may comprise running the aqueous phase through a cavitation step in order to modify the morphology of the precipitates to ensure that they do not precipitate out as scale on equipment used in method 200. In some implementations, cavitation bubbles may be generated and dispersed throughout the aqueous phase. In some implementations, such bubbles may be introduced by way of periodic oscillations or waves.

Step 218 may comprise heating the aqueous phase to generate steam. In some implementations, this steam may be condensed and the resultant water stored for later use.

Step 220 may comprise running the aqueous phase through a crossflow filtration process in order to concentrate solids from the aqueous phase. In some implementations, step 220 may comprise a crossflow ultrafiltration process.

Step 222 may comprise processing and/or storage of a permeate from step 220. For example, some implementations may comprise thermally treating a concentrated NaCl solution resulting from step 220 to generate a solid NaCl product. This product can be stored for later use. As shown in FIG. 2, process 200 may be repeated to continue processing wastewater and/or other fluid streams. It should be understood that, in some implementations, each of the various steps in process 200 may be taking place simultaneously for various different portions of such an incoming fluid stream.

Some implementations and embodiments of this invention can be used to treat/handle a variety of waste products to generate low TDS water suitable for either discharge to the environment or reuse, with the benefit of the opportunity to recover resources for beneficial reuse from the wastes. In some implementations and embodiments, waste generation may be minimized, and chemical consumption may be minimized. In some implementations and embodiments, this may be accomplished by avoiding the need for large chemical addition tanks, thereby reducing capital costs and transportation fees.

Some embodiments and implementations may further comprise use of real-time, in-line analytical monitoring techniques at one or more steps/stages to optimize process efficiency and cost by tailoring treatment requirements to clean up goals. This may be achieved by application of emergent analytical techniques employing emission spectroscopy. Some embodiments and implementations may employ use of field-portable analytical equipment.

In some implementations, an atomic spectroscopy method, such as Laser-induced spectroscopy or X-Ray Fluorescence (XRF) may be employed. For example, by installing a Laser-Induced Breakdown Spectroscopy (LIBS) prior to the electro-oxidation module, information (such as salt concentration, for example) can be collected in-line and in real-time, which can guide the adjustment of flow rates, current density, and/or retention times to ensure optimal performance. One or more such in-line analytical tools may also be installed at one or more additional downstream sites. For example, such tools may, in some embodiments and implementations, be used in the stream of an ultrafiltration permeate or condensate (after condenser 118 in the embodiment of FIG. 1) to determine whether further treatment or recycling of the stream to a previous treatment step or module is needed in order to meet desired reuse criteria.

Various embodiments and implementations of the invention may be further understood by the following Examples:

Example 1

In a first working example, water from an oil fracking site was treated in accordance with one embodiment of the invention. This treatment process involved an electrocoagulation module, an air flotation module, a carbon dioxide cavitation, and an ultrafiltration module.

A DC supply (Sinometer HY3005D, 0-30V, 0-5 A) was used as the power source for the electrocoagulation testing. Parallel plating of iron electrodes were used in the electrocoagulation module. The current used in the electrocoagulation module was approximately 3.0 A, the associated voltage setting was approximately 4.0 V, and the treatment was performed for eight minutes. Air flotation action was simulated by bubbling air to the water through a porous stone/inlet solvent filter. Filtration was achieved by pushing the water through a 0.1 μm syringe filter.

Table 1 below demonstrates various component levels both before and after treatment of the wastewater in accordance with this example.

TABLE 1

|  | Na (mg/l) | K (mg/l) | Ca (mg/l) | Mg (mg/l) | Fe (mg/l) | Ba (mg/l) | Al (mg/l) | Mn (mg/l) | Sr (mg/l) |
|---|---|---|---|---|---|---|---|---|---|
| Before | 6497.0 | 81.0 | 261.0 | 41.5 | 165.0 | 0.3 | 0.1 | 0.42 | 38.2 |
| After | 6457.0 | 74.0 | 2.2 | 0.2 | UDL[1] | UDL | UDL | UDL | 2.2 |

|  | Cl (mg/l) | Br (mg/l) | $NO_3 + NO_2$ (mg/l) | Silica (mg/l) | IC[2] (mg/l) | TOC[3] (mg/l) | Oil/grease (mg/l) | Bacteria (RLU) | Turbidity (NTU) |
|---|---|---|---|---|---|---|---|---|---|
| Before | 11387.0 | 45.0 | 0.4 | 36.1 | 151.0 | 819.4 | 8050.0 | 227.0 | 154.0 |
| After | 11244.0 | 33.4 | — | UDL | 61.9 | 574.0 | 1.0 | 0 | 0.4 |

[1]UDL: under detection limit
[2]Inorganic carbon
[3]Total organic carbon

Example 2

In a second working example, water from an oil fracking site was treated repeatedly in accordance with another embodiment of the invention. This treatment process involved an electrocoagulation module, an air flotation module, and an ultrafiltration module. Cavitation was not performed in the testing according to this example. However, the current was varied in several iterations of testing to determine the impact on treatment due to the current used during electrocoagulation.

As with the testing of Example 1, a DC supply (Sinometer HY3005D, 0-30V, 0-5 A) was used as the power source for the electrocoagulation testing, and parallel plates of iron electrodes were used in the electrocoagulation module. Air flotation action was again simulated by bubbling air to the water through a porous stone/inlet solvent filter. Filtration was achieved by pushing the water through a 0.1 μm syringe filter. However, as mentioned above, the current used in the electrocoagulation module was varied in several iterations of testing while the treatment time remained the same (six minutes).

Table 2 below demonstrates various component levels both before and after treatment of the wastewater in accordance with this example. As shown in the table, electrocoagulation has a significant impact on removal of Fe, Mn, Si, bacteria, and oil/grease, and regardless of the current intensity as long as the current is above about 1 A. Higher current, however, tends to result in better removal of alkaline earth metals (Mg, Ca, Sr, and Ba). However, of course, more energy is needed in order to achieve higher currents. Therefore, depending on the specific discharge requirements and/or energy constraints, the current intensity may be selected as desired in accordance with the results indicated in the examples provided herein. For example, if it is required that the Ca level be below 40 mg/L following electrocoagulation, 3 A may be a proper selection of the current intensity. If the restriction is only set for Si, heavy metals, bacteria and oil/grease, and/or if another method is used for removal of alkaline earth metals, a lower current intensity, such as about 1 A, may be preferable.

TABLE 2

| Current (A) | Ca (mg/l) | Mg (mg/l) | Fe (mg/l) | Mn (mg/l) | Silica (mg/l) | Ba (mg/l) | Sr (mg/l) | Bacteria (RLU) | Oil/grease (mg/l) |
|---|---|---|---|---|---|---|---|---|---|
| Raw water | 261.00 | 41.50 | 165.00 | 0.42 | 36.10 | 0.30 | 38.20 | 227 | 8050 |
| 1 | 146.10 | 3.20 | 0.05 | 0.01 | 0.31 | 0.08 | 25.10 | 0 | 10.0 |
| 2 | 72.40 | 3.00 | 0.05 | UDL | UDL | 0.03 | 17.30 | 0 | UA[1] |
| 3 | 33.10 | UDL | 0.02 | 0.02 | 0.03 | UDL | 13.70 | 0 | 3.0 |
| 4 | 5.40 | UDL | 0.02 | UDL | 0.06 | UDL | 11.30 | 0 | 5.6 |

[1]Data unavailable

Example 3

In a third working example, water from an oil fracking site was treated repeatedly in accordance with yet another embodiment of the invention. This treatment process involved an electrocoagulation module, an air flotation module, and a filtration module. Cavitation was not performed in the testing according to this example. However, the treatment time associated with electrocoagulation was varied in several iterations of testing to determine the impact on treatment due to the electrocoagulation treatment time while the applied current remained the same (3 A).

As with the testing of Examples 1 and 2, a DC supply (Sinometer HY3005D, 0-30V, 0-5 A) was used as the power source for the electrocoagulation testing, and parallel plates of iron electrodes were used in the electrocoagulation module. Air flotation action was again simulated by bubbling air through the water via a porous stone/inlet solvent filter. Filtration was achieved by pushing the water through a 0.1 μm syringe filter. However, as mentioned above, the treatment time in the electrocoagulation module varied in several iterations of testing.

Table 3 below demonstrates various component levels both before and after treatment of the wastewater in accordance with this example. Within the range tested, the treatment time did not substantially influence the removal of Fe, Mn, Si, bacteria and oil/grease, because the removal of these components was already significant after a two-minute treatment. As shown in the table, longer treatment times tend to result in better removal of alkaline earth metals. However, of course, there is a trade-off in terms of efficiency associated with electrocoagulation treatment times, since higher treatment times result in lower throughput and tend to require more energy. Therefore, depending on the specific discharge requirement, an appropriate treatment time should be selected. For example, if 40 mg/L is set as the allowed discharge level for Ca as a result of electrocoagulation, a treatment time of about eight minutes may be desirable. If the restriction is only set for Si, heavy metals, bacteria and oil/grease, and/or another method is used for removal of alkaline earth metals, a lesser treatment time, such as two minutes, may be sufficient.

Example 4

In a fourth working example, water from an oil fracking site was treated repeatedly in accordance with still another embodiment of the invention. This treatment process again involved an electrocoagulation module, an air flotation module, and a filtration module, but not a cavitation module. However, the metal used for the electrodes in the electrocoagulation module was varied in this example to determine the impact on treatment due to such materials.

As with the testing of Examples 1-3, a DC supply (Sinometer HY3005D, 0-30V, 0-5 A) was used as the power source for the electrocoagulation testing, and parallel plates of electrodes were used in the electrocoagulation module. Air flotation action was again simulated by bubbling air to the water through a porous stone/inlet solvent filter. Filtration was again achieved by pushing the water through a 0.1 μm syringe filter. However, as mentioned above, the electrodes in the electrocoagulation module were varied during testing. More particularly, aluminum electrodes were used in one test and iron electrodes were used in another test.

Table 4 below demonstrates various component levels both before and after treatment of the wastewater in accordance with this example. As shown in the table, iron tends to provide better removal of calcium and magnesium. If the wastewater is rich in calcium or magnesium and/or if substantial Ca and/or Mg removal by electrocoagulation is desired, use of an iron electrode may be preferred.

TABLE 4

| Electrode material | Ca (mg/l) | Mg (mg/l) | Fe (mg/l) | Mn (mg/l) | Si (mg/l) | Ba (mg/l) | Sr (mg/l) |
|---|---|---|---|---|---|---|---|
| Raw water | 261 | 41.5 | 165 | 0.42 | 36.1 | 0.30 | 38.20 |
| Al | 136.95 | 7.09 | UDL | 0.05 | UDL | 0.01 | 25.60 |
| Fe | 79.03 | 2.54 | UDL | 0.05 | UDL | 0.03 | 28.18 |

However, it has also been discovered that using aluminum as the electrode material may obviate the need for a DAF unit. Without being limited by theory, it is thought that this

TABLE 3

| Time (min) | Ca (mg/l) | Mg (mg/l) | Fe (mg/l) | Mn (mg/l) | Si (mg/l) | Ba (mg/l) | Sr (mg/l) | Bacteria (RLU) | Oil/grease (mg/l) |
|---|---|---|---|---|---|---|---|---|---|
| Raw water | 261 | 41.50 | 165 | 0.42 | 36.10 | 0.30 | 38.20 | 227 | 8050 |
| 2 | 165.45 | 7.67 | UDL | 0.04 | UDL | 0.09 | 33.88 | 0 | 10.0 |
| 4 | 79.03 | 2.54 | UDL | 0.05 | UDL | 0.03 | 28.18 | 1 | 2.5 |
| 6 | 78.62 | UDL | UDL | 0.06 | UDL | 0.06 | 24.45 | 0 | 4.0 |
| 8 | 20.56 | UDL | UDL | 0.05 | UDL | 0.13 | 14.99 | 0 | 1.0 | may be true because the gas bubbles formed on the surface of the aluminum electrode(s) may provide the same, or at least a similar, function as would have been provided by a DAF unit. Aluminum electrodes may be preferable for certain systems, such as systems treating wastewater having a relatively low concentration of calcium (e.g., below about 200 mg/L), those having a strict limitation on the footprint, and/or those lacking a DAF unit/module. Otherwise, iron electrodes may be preferred since they are applicable to a wider range of wastewater characteristics.

Example 5

In a fifth working example, water from an oil fracking site was treated repeatedly in accordance with another embodiment of the invention. This treatment process again involved an electrocoagulation module, an air flotation module, and a filtration module, but not a cavitation module. However, the number of electrodes (aluminum plate electrodes) in the electrocoagulation module was varied in this example to determine the impact on treatment due to varying the number of electrodes.

As with the testing of Examples 1-4, a DC supply (Sinometer HY3005D, 0-30V, 0-5 A) was used as the power source for the electrocoagulation testing, and parallel plates of electrodes were used in the electrocoagulation module. Air flotation action was again simulated by bubbling air to the water through a porous stone/inlet solvent filter. Filtration was again achieved by pushing the water through a 0.1 µm syringe filter. However, as mentioned above, the number of plate electrodes used in the electrocoagulation module varied during testing in accordance with the data presented in Table 5.

Table 5 below demonstrates various component levels both before and after treatment of the wastewater in accordance with this example. As shown in the table, increasing the number of electrodes tends to result in better removal of contaminants, even using the same current. This suggests that energy consumption may be reduced without sacrificing performance by increasing the number of plates used in an electrocoagulation module.

TABLE 5

| Plate numbers | Voltage (V)$^a$ | Ca (mg/l) | Mg (mg/l) | Fe (mg/l) | Mn (mg/l) | Si (mg/l) | Ba (mg/l) | Sr (mg/l) |
|---|---|---|---|---|---|---|---|---|
| Raw water | — | 261.0 | 41.5 | 165 | 0.4 | 36.1 | 0.3 | 38.2 |
| 6 plates | 3.3 | 25.5 | UDL | UDL | 0.02 | UDL | 0.1 | 23.1 |
| 4 plates | 4.9 | 20.6 | UDL | UDL | 0.05 | UDL | 0.1 | 15.0 |
| 2 plates | 8.0 | 23.0 | 2.7 | UDL | 0.05 | UDL | 0.1 | 21.0 |

$^a$the experiments were controlled at the same current.

It is also thought that significant improvement in energy consumption may be achieved, alone or in combination with a higher number of electrode plates (preferably parallel electrode plates), by providing a higher surface area per plate, and/or providing a smaller distance between the plates. In some embodiments, the polarity of the electrical current may be alternating to prevent scale build-up on the surface of the electrodes and also to equalize consumption rates between the electrodes. These results further suggest that iron may be a better material choice for electrodes than aluminum for many systems, due to its applicability to treatment of wastewater having a wider range of characteristics. A minimum electric charge (I·t) of about 6 A·minute may be desirable for the removal of heavy metals, bacterial, silica, and/or oil/grease. Higher electric charge may be needed for better removal of alkaline earth metal contaminants by electrocoagulation.

Example 6

In a sixth working example, water from a gas fracking well site in the Marcellus Shale was treated in accordance with another embodiment of the invention. This treatment process involved an electrochemical module, pH adjustment, a cavitation module, and a filtration module. More particular, in this example, the electrochemical module comprised an electro-oxidation module. Due to the wastewater characteristics, an electrocoagulation module was omitted from this example. In addition, a flotation/sedimentation module was also omitted from the example. Without being limited by theory, it is thought that the gas bubbles formed on the surface of the electrodes of the electrochemical module may serve one or more of the same functions of the flotation/sedimentation module, such as separating organic and light debris from the bulk liquid.

Electro-oxidation was achieved by conducting electric current through mixed-metal oxide coated titanium plates immersed under water. The electrodes used in this example comprised mesh plates in parallel. However, other embodiments are contemplated in which the plates may be solid or perforated, for example. In addition, other embodiments are contemplated in which the geometric arrangement of the electrodes could employ an annulus design.

Electro-oxidation was conducted under a 1 A electrical current for 1 minute. However, it is anticipated that these parameters may be highly dependent on the particular geometry and other parameters of the system. For example, use of higher surface area per plate, more plates, and/or shorter distances between the plates may allow for significant reduction of applied voltage, thereby providing significant improvement in energy consumption.

Treatments in accordance with the principles of this example can be performed in batch or continuous processes. In some embodiments, high chloride (or bromide) concentrations may result in production of free chlorine (or free bromine), which may be useful in the oxidation of heavy metals, breakdown of organics, and/or killing bacteria in the wastewater. In some embodiments, it may therefore be useful to equip the electro-oxidation module with a pH monitoring device and/or a free-chlorine analyzer, allowing control flexibility to a wide range of wastewater and fine tuning to variation of the feed water.

Table 6 below demonstrates various component levels both before and after treatment of the wastewater in accordance with this example.

TABLE 6

| | Na (mg/l) | K (mg/l) | Ca (mg/l) | Mg (mg/l) | Fe (mg/l) | Ba (mg/l) | Al (mg/l) | Mn (mg/l) | B (mg/l) |
|---|---|---|---|---|---|---|---|---|---|
| Before | 125500.0 | 1170.0 | 14859.0 | 1512.0 | 3.7 | 51.6 | 0.0 | 1.1 | 24.6 |
| After | 125704.0 | 1207.0 | 0.8 | UDL[1] | 0.4 | 0.2 | UDL | UDL | 39.7 |

| | Cl (mg/l) | Br (mg/l) | $SO_4$ (mg/l) | Silica (mg/l) | TSS[2] (mg/l) | TN (mg/l) | TOC[3] (mg/l) | Oil/grease (mg/l) | Bacteria (RLU) |
|---|---|---|---|---|---|---|---|---|---|
| Before | 127954.0 | 259.5 | 46.3 | 4.61 | 5755.5 | 229.6 | 29.9 | 1 | 75 |
| After | 123188.0 | 23.9 | 49.4 | UDL | 0 | 2.7 | 15.3 | 0 | 0 |

[1]UDL: under detection limit
[2]Total suspended solid
[3]Total organic carbon

Example 7

In a seventh working example, water from an gas fracking well site in the Marcellus Shale was repeatedly treated in accordance with another embodiment of the invention. This treatment process again involved an electrochemical module comprising an electro-oxidation module, pH adjustment, a cavitation module in all but one iteration of this example, and an ultrafiltration module. Electrocoagulation and flotation/sedimentation modules were again omitted from this example. However, in this example, the pH adjustments were varied in this example by adding NaOH to determine the impact on treatment efficacy due to varying this parameter.

As with Example 6, electro-oxidation was achieved by conducting electric current through mixed-metal oxide coated titanium plates immersed under water. Electro-oxidation was again conducted under a 1 A electrical current for 1 minute.

Table 7 below demonstrates various component levels both before and after treatment of the wastewater in accordance with this example. In one of the experimental iterations shown in Table 7, the result was obtained without use of a cavitation module as a reference to show the effect of cavitation. Ca was removed primarily via the mechanism of forming slightly soluble hydroxide. In some embodiments, near complete removal of the contaminants may not be achieved without a cavitation module. Otherwise, the pH values in the chart were measured before the wastewater stream entered the cavitation module. As shown in the table, increasing the pH value of the wastewater stream prior to cavitation tends to improve treatment efficacy. In addition, adjusting to higher pH levels may improve the removal of alkaline earth metals. At lower pH levels, for $CO_2$ cavitation to be functional and effective, a pH adjustment to at least about 11.5 may be desirable. Otherwise, Ca may be primarily removed in the form of hydroxide. It is worth mentioning that the pH of the effluent after the cavitation module is about neutral. Thus, no acid addition is needed for certain embodiments in the subsequent stages.

TABLE 7

| | Ca (mg/l) | Mg (mg/l) | Fe (mg/l) | Mn (mg/l) | Si (mg/l) | Ba (mg/l) | Sr (mg/l) |
|---|---|---|---|---|---|---|---|
| Raw | 14859.0 | 1512.0 | 3.7 | 1.1 | 2.4 | 51.6 | 2921.0 |
| pH = 8[a] | 9628.0 | UDL | 0.3 | 0.1 | UDL | 51.5 | 2902.0 |
| pH = 8.8[a] | 6185.0 | UDL | 0.4 | 0.1 | UDL | 50.0 | 2701.0 |
| pH = 9.7[a] | 3542.0 | UDL | 0.4 | 0.1 | UDL | 50.4 | 2762.0 |
| pH = 10.5[a] | 975.0 | UDL | 0.4 | 0.1 | UDL | 38.8 | 2292.0 |
| pH = 11.5[a] | 0.8 | UDL | UDL | UDL | UDL | 0.2 | 1.7 |
| pH = 11.5[b] without $CO_2$ | 109.0 | 0.19 | 0.05 | UDL | 0.1 | 47.2 | 2891.7 |

[a]these pHs are the values that were measured before $CO_2$ cavitation.
[b]The experiment result was obtained without $CO_2$ cavitation.

Example 8

In an eighth working example, water from a fracking site was treated in accordance with another embodiment of the invention. This treatment process again involved an electrochemical module comprising an electro-oxidation module, an electrocoagulation module, an air flotation module, pH adjustment, a cavitation module comprising a $CO_2$ hydrocavitation module, and a crossflow filtration module comprising an ultrafiltration module.

A DC supply (Sinometer HY3005D, 0-30V, 0-5 A) was used as the power source for the electro-oxidation and electro-coagulation steps in this example. Electro-oxidation was achieved by conducting electric current (1 A for 1 minute) using mixed-metal oxide coated titanium plates immersed under water. Electro-coagulation was achieved by conducting electric current (3 A for 6 minutes) using iron plates. Air floatation action was simulated by bubbling air to the liquid through a porous stone/inlet solvent filter. Filtration was achieved by pushing the liquid through a 0.1 μm syringe filter.

Table 8 below demonstrates various component levels both before and after treatment of the wastewater in accordance with this example.

TABLE 8

| | Na (mg/l) | K (mg/l) | Ca (mg/l) | Mg (mg/l) | Fe (mg/l) | Ba (mg/l) | Cu (mg/l) |
|---|---|---|---|---|---|---|---|
| Before | 100023.0 | 41.8 | 190.1 | 41.8 | 10.1 | 0.1 | 0.1 |
| After | 101250.5 | 37.0 | UDL[1] | UDL | UDL | UDL | UDL |

TABLE 8-continued

| | Mn (mg/l) | Cl (mg/l) | Br (mg/l) | Silica (mg/l) | TN[2] (mg/l) | Oil/grease (mg/l) | Bacteria (RLU) |
|---|---|---|---|---|---|---|---|
| Before | 0.4 | 111323.0 | 53.6 | 36.1 | 21.0 | 7452.0 | 378 |
| After | UDL | 110244.0 | 1.4 | UDL | UDL | UDL | 0 |

[1]UDL: under detection limit
[2]Total nitrogen

Example 9

In a ninth working example, testing was performed to simulate a potential embodiment of an evaporation module. More particularly, this example should be considered an example of a low-energy evaporation module. To obtain the results in the table below, 400 ml of water was heated on a hot-plate with stirring. The distillate was evaporated, condensed, and collected, and the chemistry of the distillate was analyzed to assess the particulate levels indicated in Table 9 below. This testing illustrates the efficacy of an exemplary embodiment of an evaporation module, such as module 116. However, other evaporation technologies, such as mechanical vapor compression evaporators and thermal evaporators, may alternatively, or additionally, be used for such a module.

Table 9 below demonstrates various component levels both before and after treatment of the wastewater in accordance with this example. The "before evaporation module" data represents contaminants in a stream of fluid, such as wastewater, that may be entering an evaporation module, such as evaporation module 116 in the system of FIG. 1. The "distillate" data represents contaminants in a distillate stream that may be exiting an evaporation module, such as evaporation module 116 in FIG. 1. Thus, the "distillate" data may represent, for example, a stream of fluid entering condenser 118 in the system of FIG. 1. The "concentrate" data represents contaminants in a concentrate stream that may be exiting an evaporation module, such as evaporation module 116 in FIG. 1. Thus, the "concentrate" data may represent, for example, a stream of fluid entering filtration module 120 in the system of FIG. 1.

This result demonstrates the potential efficacy of a working embodiment of a treatment system according to this invention, in this case, such an embodiment comprising an electrocoagulation module, an air flotation module, a $CO_2$ cavitation module, an ultrafiltration module, and a high-efficiency evaporator module. The effluent ("clean" stream) contains only 15 mg/L Na, 0.2 mg/L K, 26.1 mg/L Cl and 0.1 mg/L Br (at least substantially free of alkaline earth metals, heavy metals, silica, oil/grease and bacteria). In some embodiments, the concentrated salt solution with minimal impurity can be further concentrated and/or crystallized for producing a deicing agent for local application in winter, or can be accepted by another industrial partner for miscellaneous uses.

TABLE 9

| | Na (mg/l) | K (mg/l) | Ca (mg/l) | Mg (mg/l) | Fe (mg/l) | Ba (mg/l) | Cu (mg/l) |
|---|---|---|---|---|---|---|---|
| Before evaporation module | 6460.0 | 74.0 | 2.2 | UDL | UDL | UDL | UDL |
| Distillate (from evaporation module) | 15.0 | 0.20 | — | — | — | — | — |
| Concentrate (from evaporation module) | 43000 | 540 | 14.6 | — | — | — | — |

| | Mn (mg/l) | Cl (mg/l) | Br (mg/l) | Silica (mg/l) | TN[1] (mg/l) | Oil/grease (mg/l) | Bacteria (BLU) |
|---|---|---|---|---|---|---|---|
| Before evaporation module | UDL | 11200 | 33.4 | UDL | UDL | UDL | 0 |
| Distillate (from evaporation module) | — | 26.1 | 0.10 | UDL | UDL | UDL | 0 |
| Concentrate (from evaporation module) | — | 74700 | 222 | — | — | — | — |

[1]Total nitrogen

Figure 3:
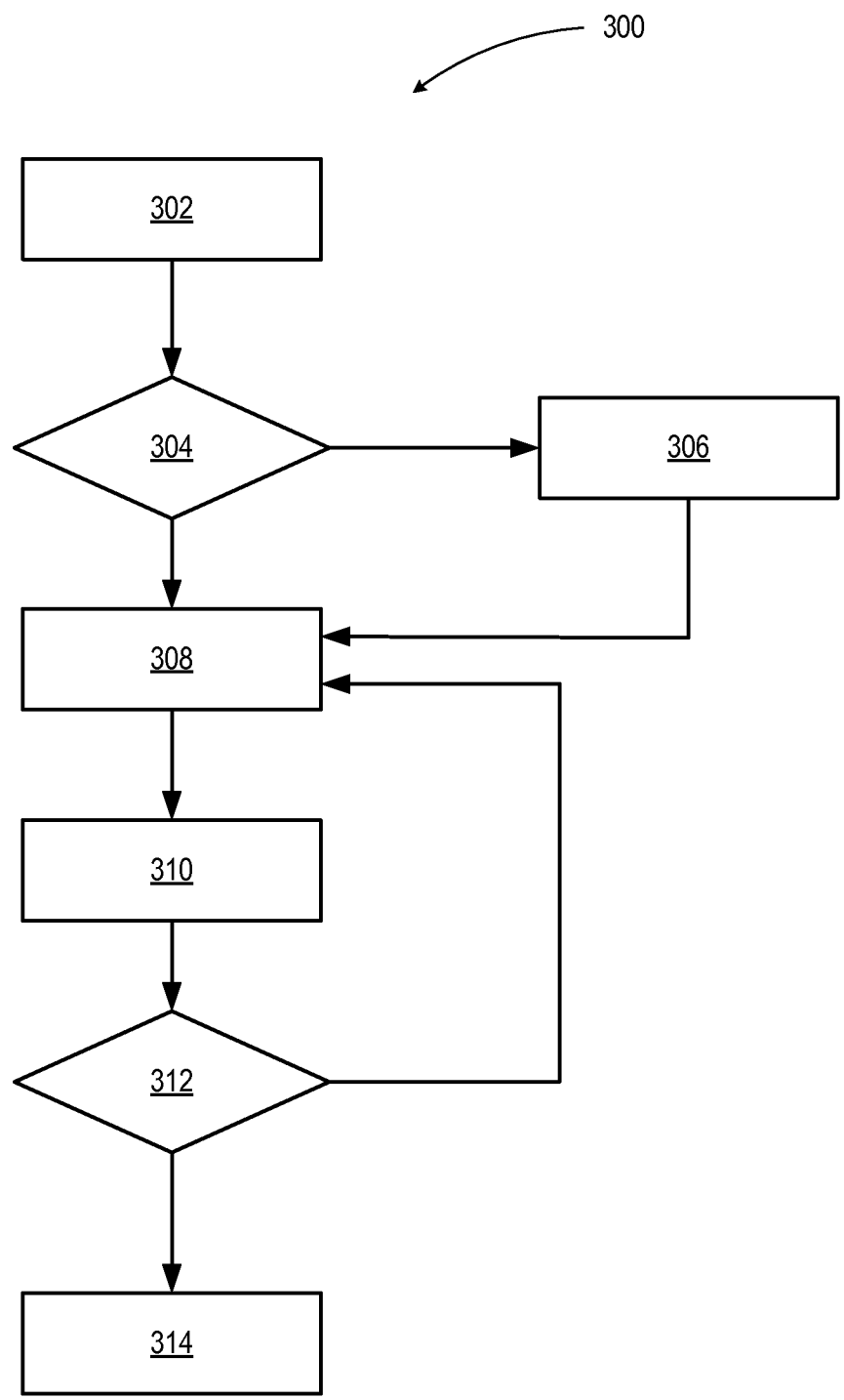
FIG. 3 is a flow chart of another implementation of a method for treatment of a fluid, such as wastewater.

Another example of a method 300 according to some implementations is depicted in FIG. 3. At step 302, LIBS technology or another technique/apparatus/system for gathering real-time data to assess and/or alter a wastewater treatment system is applied to a wastewater flow at one or more stages in the wastewater treatment system. In some implementations, step 302 may comprise use of a LIBS module, such as LIBS module 140 in system 100 of FIG. 1. In some implementations, step 302 may comprise performing an analysis of the wastewater stream as or before it enters a wastewater treatment system. Because the LIBS analysis involved in step 302 is performed before a particular treatment step and may be used to alter such treatment step, as discussed below, step 302 should be considered a pre-treatment LIBS analysis/step/module.

Data obtained from the analysis performed in step 302 may then be used to determine, at step 304, whether modification of one or more subsequent modules/steps in the treatment system are needed. For example, in some embodiments, the calcium and magnesium concentration in the incoming stream to system 100 detected by LIBS may be used to determine whether electro-coagulation or electro-oxidation would be in service. Also, such information may be used in guiding whether pH adjustment is needed and how much such adjustment is needed.

If data obtained from step 302 warrants a modification to one or more subsequent treatment parameters, method 300 proceeds from step 304 to step 306, at which point a modification may be implemented with respect to one or more treatment modules, parameters, and/or methods involved in the treatment system. For example, in some embodiments, the concentration of calcium monitored by one or more LIBS modules before an evaporation/cavitation module may be used to influence how cavitation would be operated in terms of $CO_2$ pressure and/or retention time. Also, or alternatively, such data may be used, alone or in combination with the chemistry profile of the incoming stream, as determined by a LIBS module, to assess whether and to what extent pH adjustment may be needed at this stage. In some implementations, step 302 may comprise disabling one or more subsequent modules altogether or, alternatively, bypassing such module(s).

If, at step 304, data obtained from step 302 indicates that no modification to any modules/steps/parameters is needed, then method 300 proceeds to step 308 from step 304. At step 308, the wastewater stream may undergo a particular treatment, such as any of the specific treatment modules referenced herein. Similarly, if, at step 304, data obtained from step 302 indicated that modification to any modules/steps/parameters was needed, then method 300 proceeds to step 308 from step 306 after such modification(s) have been implemented.

Following the treatment involved in step 308, another LIBS analysis may be performed at step 310. Again, like step 302, step 310 may comprise use of a LIBS module such as LIBS module 140. However, because the LIBS analysis involved in step 310 is performed after the treatment involved in step 308, and may be used to repeat such treatment step, as discussed below, step 310 should be considered a post-treatment LIBS analysis/step/module.

Step 310 may comprise assessing the wastewater after undergoing the treatment involved in step 308 to ensure that it meets certain treatment goals and/or thresholds. Data obtained from step 310 may then be used to determine, in step 312, whether to send the water through the treatment of step 308 again, as indicated in FIG. 3, or not. In some implementations, if the analysis of step 312 suggests the need for repeating a previous treatment, the wastewater may be recirculated through an identical treatment module. Alternatively, if the analysis of step 312 suggests the need for repeating a previous treatment, the wastewater may be directed to another identical or similar treatment module for further treatment.

To illustrate the principles of steps 310 and 312 with an example, in some embodiments, the threshold of one or more heavy metals (Fe, for example) may be set at 0.4 mg/L for the effluent liquid stream after module 108 (referring back to FIG. 1). The liquid with Fe exceeding the threshold may then be recirculated back through an electrochemical treatment module. If the stream following module 108 does not contain particulates exceeding the threshold, the stream may be directed through the subsequent modules without recirculation.

If the analysis of step 312 indicates that the treatment of step 308 was sufficient and/or there is no need for further such treatment, method 300 may proceed to step 314, at which point another type of treatment may be performed. Again, the treatment of step 314 may comprise use of any of the treatment modules previously disclosed.

Figure 4:
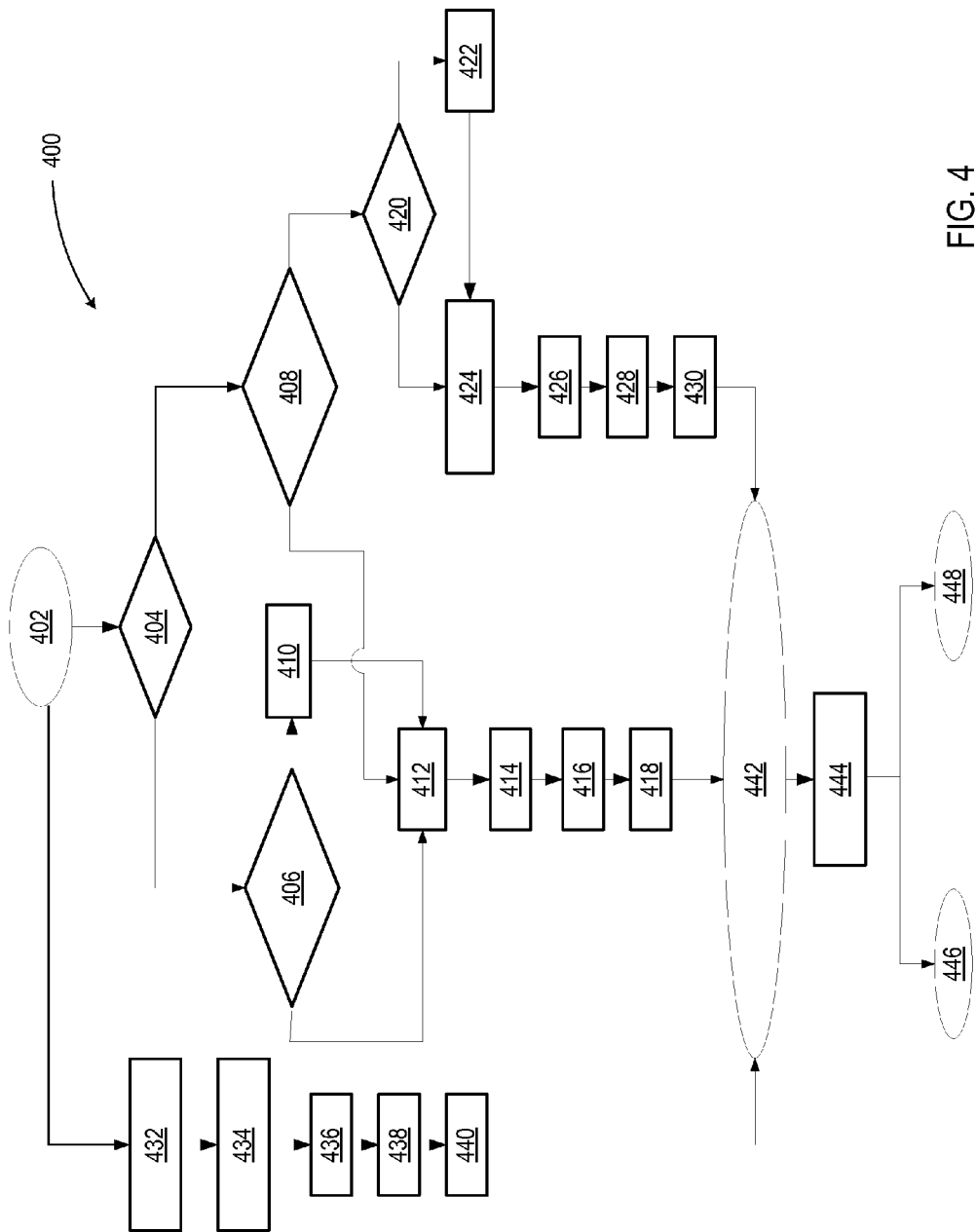
FIG. 4 is a flow chart of yet another implementation of a method for treatment of wastewater at a fracking site.

Still another example of a method 400 according to other implementations is depicted in FIG. 4. At step 402, a wastewater stream, such as a stream of frac water from a fracking site, enters a water treatment system. Following step 402, method 400 may proceed either to step 404 or to step 432. The process stemming from step 404 comprises a more environmentally-friendly or benign process, as discussed in greater detail below, relative to the process stemming from step 432. Some water treatment systems according to certain embodiments of the inventions may be configured to selectively perform either the process stemming from step 404 or the process stemming from step 432. Alternatively, such systems may be configured to perform either the process stemming from step 404 or the process stemming from step 432. In embodiments configured to selectively perform either the process stemming from step 404 or the process stemming from step 432, treatment may be performed by way of the process stemming from step 432 in circumstances where environmental concerns are not present, or are less important.

Following the process stemming from step 404, a determination may be made as to whether oil is present in the wastewater at step 404. This determination may be made by, for example, standard analytical techniques or visual inspection. In some implementations, step 404 may comprise a predetermined indication of whether oil is expected to be present that may be made depending upon the site at which the process is implemented. For example, processes implemented at a fracking site may be configured such that step 404 automatically directs the process to step 406 (discussed below), effectively disabling the portion of method 400 beginning with step 408.

If the determination at step 404 indicates that no oil is present in the water, the process proceeds to step 408, at which point another determination is made as to whether levels of particular chemicals and/or substances exceed a predetermined threshold. In some implementations, step 408 comprises determining whether Ca is present in an amount exceeding a threshold. In some such implementations, this threshold may be about 1000 mg/L. One or more of the determinations involved in step 408 may, in some implementations, be made using Laser Induced Breakdown Spectroscopy.

In some implementations, step 408 may further comprise determining whether Mg is present in an amount exceeding a threshold. In some such implementations, this threshold may be about 500 mg/L.

In some implementations, step 408 may further comprise determining whether the inorganic carbon in the water is greater than a threshold percentage of the Ca content. For example, in some implementations, step 408 may comprise determining whether the inorganic carbon in the water is greater than about 60% of the Ca content.

In certain preferred implementations, step 408 may comprise making three separate determinations, as outlined above. For example, in certain preferred implementations, step 408 may comprise determining whether the Ca content is greater than about 1000 mg/L, whether the Mg content is greater than about 500 mg/L, and whether the inorganic carbon is greater than about 60% of the Ca content.

If one or more (in preferred implementations, each) of these determinations meets the predetermined threshold, then the process proceeds to step 420, at which still another determination is made as to whether bacteria is present in the water. In some implementations step 420 may comprise determining whether a threshold amount of bacteria is present. In some implementations, step 420 may comprise determining whether any detectable level of bacteria is present. One or more such determinations may be made, for example, using a method involving detection of adenosine triphosphate (ATP) within the wastewater.

If, at step 420, it is determined that bacteria is present and/or is exceeds a predetermined threshold, the process may proceed to step 422 at which point one or more steps are taken to kill and/or remove the bacteria. For example, in some implementations, step 422 may comprise activating and/or directing water through an electro-oxidation process. In some implementations, the electro-oxidation process may be performed in an electrochemical module, such as electrochemical module 104 of FIG. 1.

Following step 422, the process may proceed to step 424, at which point a pH adjustment may be made. In preferred implementations, step 424 may comprise increasing the pH of the water to between about 11 and about 12. If, at step 420, it is determined that bacteria is not present and/or does not exceed a predetermined threshold, the process may proceed directly from step 420 to step 424.

Following step 424, water may be directed to a flotation/sedimentation module, such as module 108 in FIG. 1, at step 426. In certain preferred implementations, a DAF ("Dissolved Air Flotation") unit may be used in step 426.

Following step 426, water may be directed to an evaporation module, such as module 116, at step 428, which may facilitate precipitation of scale-forming elements. In some implementations, step 428 may be performed using carbon dioxide gas. Such gas may, in some implementations, be introduced from exhaust gases produced from, for example, the combustion of hydrocarbon fuels (e.g., diesel, natural gas, etc.) already taking place at one or more modules within a system configured to perform method 400 or otherwise drawn from an on-site combustion process apart from such a system.

The process may then proceed to step 430 for ultrafiltration of the stream. In some implementations, step 430 may comprise sending the stream through a crossflow filtration module, such as crossflow filtration module 120 of FIG. 1.

Following step 430, the process may then proceed to step 442 at which point the stream of water may be directed out of the treatment system. Preferably, at step 442, the water comprises a solution of NaCl having Ca and Mg levels less than about 10 mg/L without any detectable, or at least any significant, amounts of bacteria, oil, or any heavy metals.

In some implementations, method 400 may terminate at step 442. However, in other implementations, the process may then continue to step 444 for further processing by further concentrating and/or crystallizing salt extracted from the stream. In some implementations, step 444 may be performed at a different site/system. In other implementations, the same system used to perform the steps previously described may be used. Step 444 may, in some implementations, be performed using a thermal processor, such as module 124. The concentrated salt(s) may be compiled at 448 separate from the clean water stream at 446.

Returning to step 408 in method 400, if one or more of the determinations of step 408 are under the predetermined threshold(s), then the process proceeds to step 412, which may comprise an electrocoagulation process. In some implementations, step 412 may comprise actuating and/or directing the stream to an electrocoagulation module, such as module 106.

Following the electrocoagulation treatment of step 412, the process may then proceed through steps 414, 416, and 418. Steps 414, 416, and 418 may comprise steps similar or identical to steps 426, 428, and 430. In some implementations, these steps may comprise, respectively, Dissolved Air Flotation treatment, precipitation of scale-forming elements using carbon dioxide gas, and ultrafiltration.

Returning to step 404, if oil is detected in the wastewater stream (or if the process/system is configured to assume the presence of oil), method 400 may proceed from step 404 to step 406, at which point a determination is made as to whether levels of particular chemicals and/or substances exceed a predetermined threshold. In some implementations, step 406 comprises determining whether Ca is present in an amount exceeding a threshold. In some such implementations, this threshold may be about 1000 mg/L. One or more of the determinations involved in step 406 may, in some implementations, be made using Laser-Induced Breakdown Spectroscopy.

In some implementations, step 406 may further comprise determining whether Mg is present in an amount exceeding a threshold. In some such implementations, this threshold may be about 500 mg/L.

In some implementations, step 406 may further comprise determining whether the inorganic carbon in the water is greater than a threshold percentage of the Ca content. For example, in some implementations, step 406 may comprise determining whether the inorganic carbon in the water is greater than about 60% of the Ca content.

In certain preferred implementations, step 406 may comprise making three separate determinations, as previously described. For example, in certain preferred implementations, step 406 may comprise determining whether the Ca content is greater than about 1000 mg/L, whether the Mg content is greater than about 500 ppm or mg/L, and/or whether the inorganic carbon is greater than about 60% (molar percentage) of the total contents of alkaline earth metals.

If one or more (in preferred implementations, each) of these determinations meets the predetermined threshold, then the process proceeds to step 410 at which point a pH adjustment is made. As with step 424, step 410 may, in certain preferred implementations, comprise adjusting the pH level to between about 11 and about 12.

If one or more of the determinations of step 406 are under the predetermined threshold(s), then the process proceeds to step 412 from step 406. Step 412, as previously mentioned, may comprise an electrocoagulation process. Following step 412, the process may then proceed through steps 414, 416, 418, 442, and 444, as previously described.

As an alternative to the process stemming from step 404, method 400 may instead proceed from 402 to step 432, as shown in FIG. 4. In step 432, a carbonate salt, such as calcium carbonate may be added to the wastewater to facilitate further processing of the water, such as precipitation of heavy metals for example.

Following step 432, the water stream may be subjected to a hydrocyclone or a settling process at step 434, which may be used to separate certain types of fluids and/or other substances, such as oil, from the water. The process may then proceed to step 436, which may comprise an electrocoagulation process, as described above in connection with step 412.

Step 438 may comprise directing the stream into and/or through a flotation/sedimentation module, such as module 108 in FIG. 1. In certain preferred implementations, a DAF ("Dissolved Air Flotation") unit may be used in step 438. Following step 438, the water may undergo ultrafiltration, such as crossflow ultrafiltration module, at step 440. The process may then proceed to step 442, which is described above.

It will be understood by those having skill in the art that changes may be made to the details of the above-described embodiments without departing from the underlying principles presented herein. For example, any suitable combination of various embodiments, or the features thereof, is contemplated.

Throughout this specification, any reference to "one embodiment/implementation," "an embodiment/implementation," or "the embodiment/implementation" means that a particular feature, structure, or characteristic described in connection with that embodiment/implementation is included in at least one embodiment/implementation. Thus, the quoted phrases, or variations thereof, as recited throughout this specification are not necessarily all referring to the same embodiment/implementation.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment or implementation. Accordingly, this disclosure is to be regarded in an illustrative rather than a restrictive sense, and all such modifications are intended to be included within the scope thereof.

Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element.

It should be further understood that the method steps and/or actions described herein may be interchanged with one another. In other words, unless a specific order of steps or actions is explicitly required for proper operation of the embodiment, the order and/or use of specific steps and/or actions may be modified. In addition, it should be understood that other implementations of such methods need not necessarily include each of the recited steps, and further that certain steps from certain implementations disclosed herein may be interchanged with other implementations, as those of ordinary skill in the art would appreciate.

It will be apparent to those having skill in the art that changes may be made to the details of the above-described embodiments without departing from the underlying principles set forth herein. The scope of the present invention should, therefore, be determined only by the following claims.

The invention claimed is:

1. A system for treatment of wastewater, comprising:
   a wastewater feed port configured to receive an incoming stream of wastewater;
   an electro-oxidation module configured to receive an incoming wastewater stream and facilitate precipitation of one of more contaminants from the wastewater stream passing therethrough;
   an electrocoagulation module comprising at least two electrodes, wherein the electrocoagulation module is configured to receive an incoming wastewater stream and remove one or more contaminants from the wastewater stream passing therethrough;
   a flotation module configured to receive and separate an incoming wastewater stream into an aqueous phase stream and at least one of an oil phase stream and a sludge phase stream;
   an evaporation module configured to receive the aqueous phase stream from the flotation module and further configured to remove scale-forming elements within the aqueous phase stream;
   an ultrafiltration module configured to receive an incoming stream, remove precipitated solids formed by the evaporation module, and deliver an outgoing stream of permeate comprising a salt solution; and
   a detection module configured to detect a pH of the wastewater before the wastewater enters the electro-oxidation module, wherein the system is configured to disable at least one of the electro-oxidation module and the electrocoagulation module or divert the wastewater stream to avoid at least one of the electro-oxidation module and the electrocoagulation module upon detecting a threshold pH of wastewater before the wastewater enters the electro-oxidation module.

2. The system of claim 1, wherein the electro-oxidation module and the electrocoagulation module are part of a single treatment unit.

3. The system of claim 1, wherein at least one of the electro-oxidation module and the electrocoagulation module is configured to increase the pH of the wastewater stream to between about 11 and about 12.

4. The system of claim 1, wherein the detection module comprises a Laser-Induced Breakdown Spectroscopy module.

5. The system of claim 1, wherein the threshold pH is about 11, and wherein at least one of the electro-oxidation module and the electrocoagulation module is configured to increase the pH of the wastewater stream to between about 11 and about 12 upon receiving an indication from the detection module that the wastewater stream has a pH below the threshold.

6. The system of claim 1, wherein the flotation module is further configured to skim coagulated oil from the surface of the wastewater stream entering the flotation module.

7. The system of claim 1, further comprising a carbon dioxide line configured to deliver carbon dioxide gas to the evaporation module.

8. The system of claim 7, wherein the carbon dioxide gas delivered to the carbon dioxide gas line is generated from exhaust resulting from the combustion of hydrocarbon fuels at a treatment site of the system for treatment of wastewater.

9. The system of claim 8, wherein the carbon dioxide gas delivered to the carbon dioxide gas line is generated from exhaust resulting from the combustion of hydrocarbon fuels by one or more modules of the system for treatment of wastewater.

10. The system of claim 1, wherein the system comprises a mobile wastewater treatment system configured to allow for transporting the wastewater treatment system to a plurality of distinct treatment sites, wherein the mobile wastewater treatment system further comprises at least one of a trailer and a motor vehicle.

11. The system of claim 1, further comprising a thermal processor configured to receive an incoming stream comprising a salt solution from the ultrafiltration module and deliver a solid sodium chloride salt product at first port and a purified stream of water at a second port.

* * * * *